April 14, 1964 W. C. BECKER ETAL 3,128,725
METHODS AND APPARATUS FOR SHAPING BAKING
MATERIALS AND THE LIKE
Filed Oct. 5, 1960 4 Sheets-Sheet 1

INVENTORS
WILLIAM C. BECKER
EVERETT SMITH JR.

BY Glenn L Jackson

THEIR ATTORNEYS

INVENTORS
WILLIAM C. BECKER
EVERETT SMITH JR.

BY Glenn L Jackson

THEIR ATTORNEYS

United States Patent Office 3,128,725
Patented Apr. 14, 1964

3,128,725
METHODS AND APPARATUS FOR SHAPING BAKING MATERIALS AND THE LIKE
William C. Becker, New Rochelle, N.Y., and Everett Smith, Jr., Waldwick, N.J., assignors to Reynolds Metals Company, Richmond, Va., a corporation of Delaware
Filed Oct. 5, 1960, Ser. No. 60,677
11 Claims. (Cl. 107—54)

This invention relates to improved methods and mold structures for shaping products. This invention also relates to improved methods and containers for packaging moldable material whereby the containers can be subsequently utilized to form mold structures having desired configurations for shaping the material originally packaged therewith.

One feature of this invention is to provide a container structure for originally packaging and merchandising cake mix material or other moldable material, in such a manner that the ultimate consumer will readily select that particular cake mix instead of competitors' products because of the desirable features provided by the container structures of this invention, which are not available in prior known container structures.

For example, not only are the container structures of this invention adaptable for subsequently baking the cake mix material therein, but also the ultimate consumers can form mold chambers in the containers with any selected configurations to form baked products having desired configurations by practising the methods of this invention and utilizing the mold-forming structures of this invention.

Thus, when the ultimate consumer selects a particular cake mix packaged in a container of this invention, the consumer can subsequently bake a cake having any selected configuration without utilizing any of the conventional household equipment that would require subsequent cleaning thereof, because the container structure itself can be utilized for such baking operation and, thereafter, be thrown away. Accordingly, not only is the sales appeal of the cake mix packaged according to the teachings of this invention greatly increased over conventionally packaged cake mixes, but also the sale of the cake mix is greatly increased during special seasons, such as Christmas and the like, because the ultimate consumer can readily shape and bake the cake mix material into the particular configurations appropriate for those seasons, such as Christmas tree configurations and the like, instead of purchasing such specially baked products, as in the past, because of the lack of appropriate mold structures for forming such specially baked goods.

In one embodiment of this invention, improved mold-forming means are provided to cooperate with the container structure in such a manner that the ultimate consumer can construct a mold chamber having any selected configuration in the container for shaping and baking the material originally packaged therewith, with a minimum of time and effort and without special skills or experience in such matters, the mold-forming means retaining its desired shape regardless of the expanding and rising material during the baking operation, whereby the resulting baked product will have a desired configuration.

Since the containers and mold-forming means of this invention are relatively simple and inexpensive to manufacture, the same do not appreciably add to the cost of the packaged goods, whereby the goods packaged according to the teachings of this invention can be sold at competitive prices and further provide the added features of a cake baking and shaping device.

While the various methods and structures of this invention are adaptable for use in packaging and forming baked products, it is to be understood that the same are also readily adaptable for packaging and shaping other moldable products, such as frozen products and the like.

Accordingly, it is an object of this invention to provide improved means for forming a mold chamber having a selected configuration.

It is another object of this invention to provide an improved method for forming such a mold chamber or the like.

Another object of this invention is to provide an improved package construction having one or more of the novel features set forth above or hereinafter shown or described.

Another object of this invention is to provide an improved method of packaging moldable goods and the like.

A further object of this invention is to provide an improved method of shaping moldable goods and the like.

Other objects, uses, and advantages of this invention are apparent from a reading of this description, which proceeds with reference to the accompanying drawings forming a part thereof and wherein:

FIGURES 18, 19, and 20 are views similar to FIG-

URE 17 and respectively illustrate other embodiments of this invention.

While the packaging, merchandising, mold making, and molding or shaping methods of this invention, as well as the particular structures of the containers, mold-forming members, and mold structures of this invention are hereinafter described in connection with baking materials, such as cake mix and the like, it is to be understood that other types of moldable materials are readily adaptable to be utilized therewith. For example, certain edible, moldable materials, such as gelatin-forming materials, custard-forming materials, ice cream-forming materials, and the like, and non-edible, moldable materials, such as candle-forming materials, form-setting clay materials, and the like can be utilized.

Accordingly, the structures and methods hereinafter set forth have a wide variety of uses, and this invention is not to be limited to the particular embodiments thereof illustrated in the drawings, as the same are merely to disclose one application thereof, so that other applications thereof can be readily understood. Thus, the term "baking material" as utilized throughout this description and the appended claims is intended to relate to any suitable, moldable material or materials.

Figure 1:
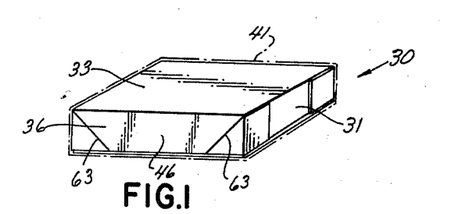
FIGURE 1 is a perspective view of a package construction of this invention, containing the necessary items to produce the shaped product illustrated in FIGURE 2.

Referring to FIGURE 1, an improved package construction of this invention is generally indicated by the reference numeral 30 and comprises a container 31 having moldable material and mold-forming means originally packaged therein, so that the ultimate consumer can utilize the package construction 30 to form a completed product or products having a selected configuration or configurations, without requiring the use of additional mold-forming structures or parts.

For example, the package construction 30 illustrated in the drawings contains a suitable baking material or cake mix, packaged either in its completed, ready-for-baking condition or in a dry condition for subsequent mixing with the proper ingredients. The cake mix is subsequently disposed in the mold-defining means of the container 31, to be shaped thereby and baked therein to form a single layer cake or multiple layer cake, such as the layer cake 32 illustrated in FIGURE 2, having a selected configuration without utilizing the conventional baking pans and the like that would require subsequent cleaning, and, thus, additional work for the ultimate consumer. Further, the container 31 permits the ultimate consumer to shape the cake mix into any desired configuration or configurations, a feature not even provided by conventional baking utensils and heretofore unheard of in container structures.

In the embodiment illustrated in the drawings, the container 31 of the package construction 30 comprises two container parts or sections 33 and 34, each being formed in substantially the same manner. However, it is to be understood that the sections 33 and 34 can be dissimilar, as desired.

Figure 3:
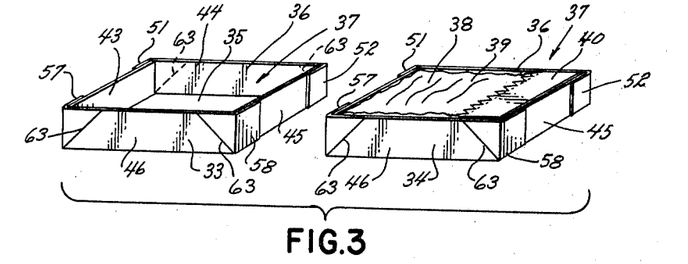
FIGURE 3 is a perspective view illustrating a container of this invention in its initially opened position.

Each container section 33 and 34 includes a substantially rectangular base portion or wall 35 having a continuous side wall means 36 extending outwardly from the perimeter of the wall 35 to define a substantially rectangular compartment 37 in the manner illustrated in FIGURE 3.

The top section 33 is made slightly larger than the bottom section 34 thereof, whereby the side wall means 36 of the bottom section 34 are telescopically received within the side wall means 36 of the container section 33 when the sections 33 and 34 are assembled together in the manner illustrated in FIGURE 1 to form the closed container 31.

When the baking material or cake mix 38 is initially packaged, the same can be hermetically sealed in a suitable wrapper or bag 39, which is adapted to be disposed in the compartment 37 of the container section 34, in the manner illustrated in FIGURE 3. The bag 39 can be formed of any suitable material to permit kneading thereof in order to properly mix the baking material 38 with a desired liquid subsequently disposed in the bag 39 by the consumer or originally packaged therein to form the baking material 38 into its baking condition. Thus, the cake mix 38 need not be removed from the bag 39 by the ultimate consumer until the same is disposed into the mold means of this invention, whereby bowls and mixing equipment need not be utilized which would have to be subsequently cleaned.

Mold-forming means 40 of this invention is also disposed in the compartment 37 of the container section 34 to be subsequently utilized by the ultimate consumer to form a mold chamber or chambers in the container sections 33 and 34 in a manner hereinafter described to subsequently shape the baking material 38 into a desired configuration or configurations.

Thereafter, the container section 33 is utilized to close the packed container section 34 and is secured thereto in any suitable manner to provide a tamper-proof arrangement and hold the sections 33 and 34 in their assembled relationship, whereby the package construction 30 can be subsequently shipped to the merchandiser who displays and sells the same to the ultimate consumer or the like. If desired, each package construction 30 can be provided with a suitable overwrap 41, as illustrated in FIGURE 1, not only to protect the contents of the container 31 but also to hold the container sections 33 and 34 together in their assembled relation and provide the above-mentioned tamper-proof relationship. Also, the overwrap 41 can be so constructed and arranged that the same will fully seal the container 31 and protect the cake mix 38 disposed therein, whereby the bag 39 can be eliminated, if desired, or utilized in addition to the overwrap 41.

Figures 7, 9, 10, 11:
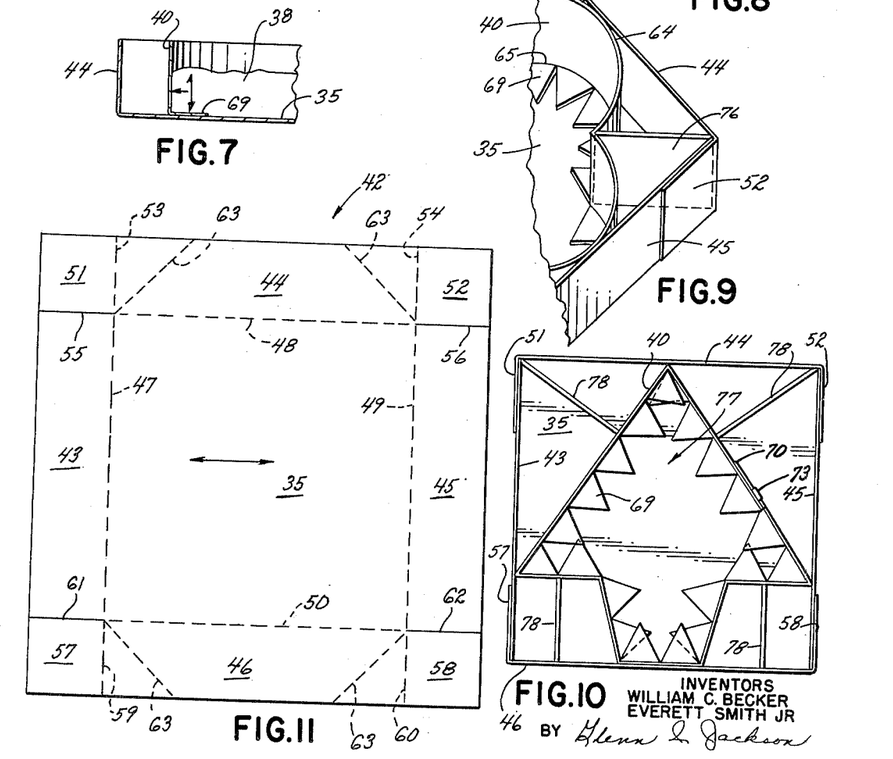
FIGURE 7 is a fragmentary, cross-sectional view of the structure illustrated in FIGURE 6 and is taken on line 7—7 thereof.
FIGURE 9 is a fragmentary, perspective view of the mold structure of FIGURE 8.
FIGURE 10 is a view similar to FIGURE 6 and illustrates the method of forming a Christmas tree mold chamber.
FIGURE 11 is a plan view of a container blank for forming one of the container sections of this invention.

Each container section 33 and 34 can be formed of any suitable material and in any suitable manner, and, in the embodiment illustrated in the drawings, the container sections 33 and 34 are formed from container blanks similar to blank 42 illustrated in FIGURE 11. The container blank 42 is formed of any suitable material which can be subsequently utilized as a baking means in a manner hereinafter described. For example, the container blank 42 can be formed of cardboard, paperboard, and the like, and be lined on the exterior surface and/or interior surface thereof with any desirable material, such as aluminum foil and the like, or be devoid of such lining material, because it has been found that the temperature normally encountered for baking goods, such as the cake mix 38, will not adversely affect such paper products. However, it is to be understood that the container sections 33 and 34 can be formed of other suitable materials, as desired, as long as the particular material will satisfactorily perform its required function during the subsequent molding operation.

Each container blank 42 is substantially rectangular and is suitably cut and scored to define a substantially rectangular base portion or wall 35 foldably connected to a plurality of rectangular walls 43, 44, 45, and 46 at the respective score or fold lines 47, 48, 49, and 50, the grain of the blank 42 preferably running in the direction indicated by the arrows in FIGURE 11.

A pair of interconnecting flaps 51 and 52 are respectively foldably connected to the opposed ends of the side wall 44 at the respective score or fold lines 53 and 54, the interconnecting flaps 51 and 52 being respectively separated from the side walls 43 and 45 by die cuts 55 and 56.

Similarly, a pair of interconnecting flaps 57 and 58 are respectively foldably connected to the opposed end edges of the side wall 46 at the respective score or fold lines 59 and 60 and separated from the side walls 43 and 45 by the respective die cuts 61 and 62.

The side walls 44 and 46 are each provided with a pair of diagonally disposed score or fold lines 63, which respectively extend from the inner corners thereof to the outer free edges thereof at angles of approximately 45° relative to the score or fold lines 48 and 50. By thus scoring the side walls 44 and 46, the particular container section 33 or 34 formed from the blank 42 is adapted to be collapsed in a manner hereinafter described.

After a plurality of container blanks have been suitably cut and scored in the above manner, the sections 33 and 34 of the containers 31 are each formed in substantially the same manner from appropriate blanks, the blanks 42 for the container sections 33 being slightly larger than the blanks 42 for the container sections 34 in order to permit the telescoping arrangement of the sections 33 and 34 previously described.

In order to erect a container section 33 or 34 from a blank 42, the side walls 43–46 are respectively brought at right angles relative to the bottom wall 35 by folding the same on the respective score or fold lines 47–50. Thereafter, the interlocking flaps 51 and 57 are folded on their respective score or fold lines 53 and 59, in such a manner that the same are disposed against the exterior surface of the side wall 43 in the manner illustrated in FIGURES 3 and 12, the interconnecting flaps 51 and 57 being secured to the side wall 43 in any suitable manner, such as by an interposed layer of gluing or the like. Similarly, the interconnecting flaps 52 and 58 are bent at their respective score or fold lines 54 and 60 to be disposed against the exterior surface of the side wall 45 and suitably secured thereto, to permit the side walls 43–46 to extend outwardly from the base section 35 to form the substantially rectangular compartment 37 thereof. Since the container sections 33 and 34 are subsequently utilized as baking means, the adhesive selected for securing the interconnecting flaps 51, 52, 57, and 58 in place should be formed of a substance which is not adversely affected by heat normally encountered when baking the particular material originally packaged in the container 31 and that will not contaminate the baking material. One such adhesive is a polyvinyl alcohol base adhesive sold as BW–1182 by Polymer Industries of Stamford, Connecticut.

Although the flaps 51, 57 and 52, 58 could be secured to the inside surfaces of the respective side walls 43 and 45, if desired, it is preferred to secure the same in the positions illustrated in the drawings in order to provide smooth interior surfaces for the compartments 37 of the container sections 33 and 34, as the compartments 37 are sometimes utilized as mold chambers to form rectangular cake layers.

Figure 12:
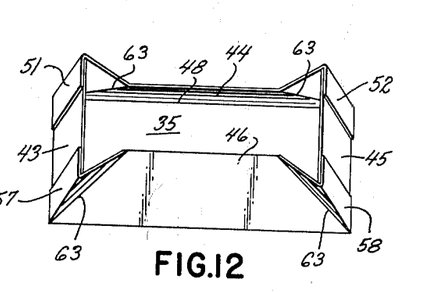
FIGURE 12 is a perspective view illustrating the method of collapsing one of the container sections of this invention.
Figures 13, 16:
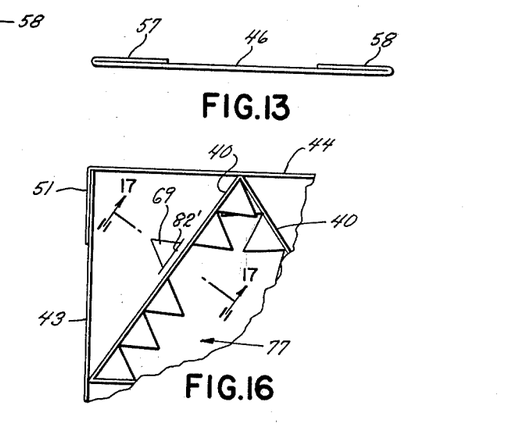
FIGURE 13 is an end view of the container section of FIGURE 12 and illustrates the same in its fully collapsed position.
FIGURE 16 is a view similar to FIGURE 15 and illustrates the method of disposing the mold-forming member in the particular container section.

When it is desired to ship the assembled container sections 33 and 34 to the cake mix manufacturer and the like, each section 33 and 34 can be collapsed in the manner illustrated in FIGURES 12 and 13 by causing the side walls 46 and 44 to be folded on the score lines 48 and 50, against the bottom wall 35, while the side walls 43 and 45 are folded downwardly on top of the side walls 44 and 46, in the manner illustrated in FIGURE 13. Such folding or collapsing arrangement is permitted by the side walls 44 and 46 folding along the diagonal score or fold lines 63, in the manner illustrated in FIGURE 12. Thus, a plurality of collapsed container sections 33 and 34 can be shipped in a minimum of space by stacking the same one on top of the other and, thereafter, easily erected to article-receiving positions by merely pulling outwardly on the side walls 44 and 46.

Figure 4:
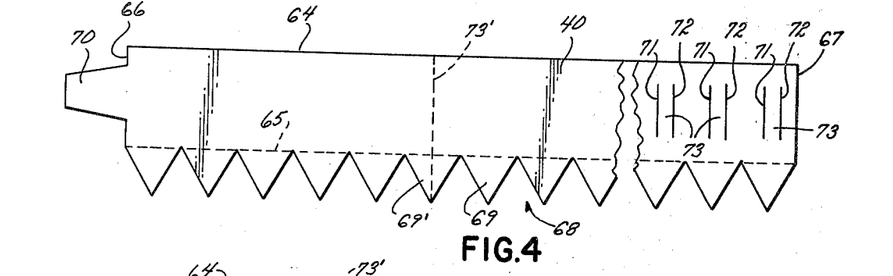
FIGURE 4 is an enlarged plan view of the mold-forming member of this invention.

The mold-forming means 40 of this invention is illustrated in FIGURE 4 and comprises an elongated strip formed of any suitable flexible material, such as cardboard and the like, having aluminum foil and the like disposed on one or both sides thereof, if desired. In the embodiment illustrated in the drawings, the mold-forming means 40 is formed from the same type of cardboard as the container sections 33 and 34, as the same is not adversely affected by the particular heat required to bake the cake mix 38 in the mold chamber defined in part by the strip 40.

When the mold-forming means 40 is made from cardboard or the like, the same can be suitably die cut from desired stock and includes a pair of opposed, substantially parallel end edges 64 and 65 and a pair of opposed ends 66 and 67. Flange means, generally indicated by the reference numeral 68, is foldably connected to the end edge 65 of the strip 40, the end edge 65 of the strip 40 being defined by a score or fold line.

While the flange means 68 may be formed in any desired manner, the embodiment thereof illustrated in the drawings comprises a plurality of triangular legs or sections 69 each having one side thereof foldably connected to the end edge 65 of the strip 40. Each triangular section or segment 69 is substantially equilateral and is disposed closely adjacent to the sections 69 disposed on each side thereof. In this manner, the strip 40 can be bent into any desired configuration and the flange sections 69 thereof can be subsequently bent transversely thereto without unduly affecting such bent condition of the strip 40 for a purpose hereinafter described.

Figure 5:
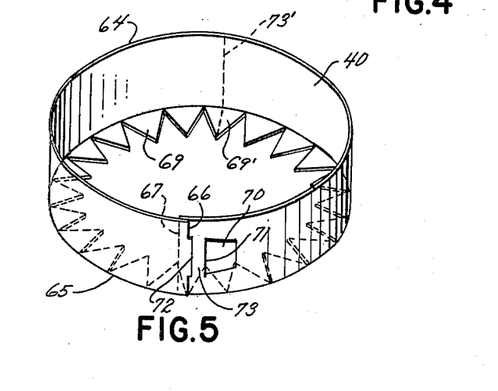
FIGURE 5 is a perspective view of the mold-forming member of FIGURE 4 formed into a substantially cylindrical configuration.
Figure 8:
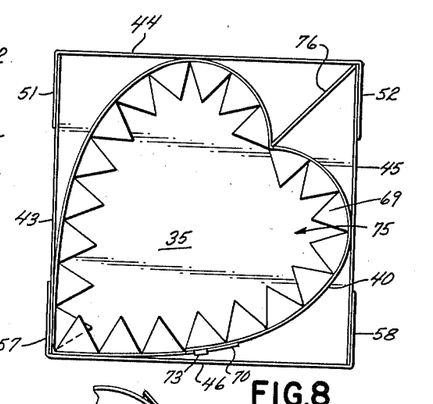
FIGURE 8 is a view similar to FIGURE 6 and illustrates the method of forming a heart-shaped mold chamber.

An interlocking tongue 70 extends from the end 66 of the strip 40 and is adapted to be inserted through a selected pair of a plurality of pairs of die cuts 71 and 72 formed in the end 67 thereof to bring the ends 66 and 67 thereof into overlapping relation in the manner illustrated in FIGURES 5, 8, and 10, each pair of die cuts 71 and 72 defining a tab 73 that locks against the tongue 70 inserted therethrough.

One or more mold-forming strips 40 are placed in the container 31, in the flat, folded manner illustrated in FIGURE 3, because the height of the body of the strips 40 is substantially the same as the depth of the compartment 37 of the container section 34.

In order to dispose the elongated strips 40 in the container 31, it is necessary to fold the same at any desired location or locations along the strip 40. Preferably, the strip 40 is folded along lines similar to line 73′, illustrated in FIGURES 4 and 5, so that the strip 40 is folded along a line which bisects one of the flange segments 69′. Thus, when the strip 40 is utilized to form a desired configuration, with the flange segments 69 disposed substantially transversely to the body of the strip 40, in the manner illustrated in FIGURE 5, the formerly creased segment 69′ tends to maintain the bent or creased portion 73′ of the body of the strip 40 in a smooth configuration, because of the transverse relation of the foot 69′ relative to the crease 73′ in the body of the strip 40.

In the embodiment illustrated in the drawings, two such strips 40 are provided in the container 31 so that each strip 40 can cooperate with a particular container section 33 or 34 to provide mold structures in the following manner. However, it is to be understood that only one strip 40 need be provided as long as the same is of a sufficient length to be utilized by the consumer to form mold chambers in both container sections 33 and 34 when the strip 40 is cut into two pieces.

Figure 2:
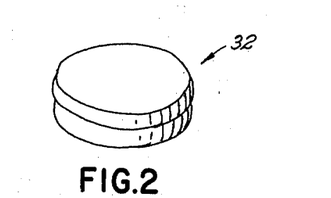
FIGURE 2 is a perspective view of a layer cake formed by the structures and methods of this invention.

After the ultimate consumer has purchased the package construction 30 from the merchandiser, the consumer can form the baked product 32, illustrated in FIGURE 2, in the following manner.

After the sections 33 and 34 have been separated and the cake mix 39 and mold-forming means 40 removed therefrom, each mold-forming strip 40 is formed into the cylindrical configuration illustrated in FIGURE 5 by inserting the tongue 70 through the appropriate pair of die cuts 71 and 72 thereof in the manner previously described.

Since each mold-forming strip 40 is adapted to form more than one basic configuration, as will be apparent hereinafter, each strip is provided with a plurality of pairs of perforated or die cut lines 71 and 72, in the manner illustrated in FIGURE 4, with each set being appropriately marked for a particular mold configuration so that the consumer can insert the tongue 70 in the appropriate set of die cuts 71 and 72 when forming that desired basic configuration.

Figure 6:
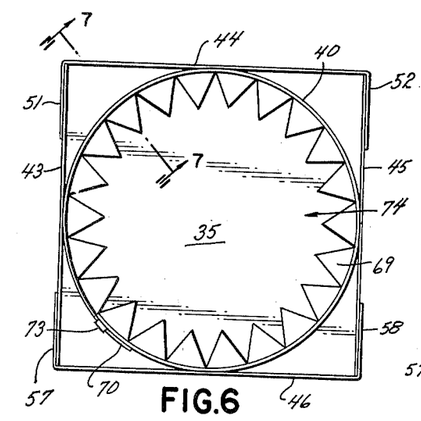
FIGURE 6 is an enlarged, top view illustrating the manner of positioning the mold-forming member of FIGURE 5 within one of the container sections illustrated in FIGURE 3 to produce a cylindrical mold chamber.

For example, when the tongue 70 of each mold-forming strip 40 is disposed in the particular die cut locking means 71–73 marked for a cylindrical configuration, the resulting cylindrical configuration thereof, illustrated in FIGURE 5, is adapted to be received in one of the carton sections 33 and 34, in the manner illustrated in FIGURE 6, whereby the strip 40 forms the perimeter of a cylindrical mold chamber 74 and is disposed in tangential engagement with the interior surfaces of the side walls 43–46 of the carton section 33. Each strip 40 is placed in the particular carton section 33 or 34 in such a manner that the end edge 65 thereof is disposed against the bottom wall or base portion 35 thereof, with the flange segments 69 bent transversely thereto and projecting into the mold chamber 74 for a purpose hereinafter described.

Although the compartment 37 of the container section 33 is slightly larger than the compartment 37 of the container section 34, the ends 66 and 67 of each strip 40 overlap in such a manner when secured together by the locking means 71–73 that the particular strip 40 can be adjusted so as to be disposed in tangential contact with the side wall means 36 of either container section 33 or 34 by inserting the tongue 70 under the appropriate tab 73 to a greater or lesser degree to change the peripheral length of the strip 40.

While locking means 70–73 are illustrated for each strip 40, it is to be understood that any other suitable means may be provided for holding the ends 66 and 67 together.

Thereafter, a suitable quantity of cake mix 38 is placed in each of the mold chambers 74 formed in the container sections 33 and 34 in the manner illustrated in FIGURE 7 to a desired height, such height being predetermined and appropriately marked on the interior surface of the strip 40 by the manufacturer thereof to assist the ultimate consumer in properly filling the mold chambers 74. If required, the interior surfaces of the mold chambers 74 can be suitably greased with butter and the like before the cake mix is disposed therein to prevent sticking of the baked products.

After the mold chambers 74 of the container sections 33 and 34 have been filled with the cake mix 38, the container sections 33 and 34 are placed in a suitable oven or the like wherein the cake mix 38 is subsequently baked according to appropriate instructions.

During the baking operation, the cake mix 38 not only tends to rise but also tends to expand outwardly. However, since the flange segments 69 are interposed between the cake mix 38 disposed in the mold chamber 74 and the base portion 35 of the particular container section 33 or 34, in the manner illustrated in FIGURE 7, the action of the cake mix 38 tending to rise upwardly causes a reaction in the opposite direction, whereby the rising cake mix 38 itself tends to press the flange segments 69 into intimate contact with the base portion 35 to thereby maintain the end edge 65 of the mold-forming strip 40 into intimate contact with the base section 35 during the baking operation. If the flange segments 69 were eliminated, the rising cake mix 38 would carry the strip 40 upwardly therewith and thereby seep and expand outwardly between the raised end edge 65 of the strip 40 and the base portion 35, causing an irregularly shaped baked product.

Also, as the cake mix 38 is baking, the same tends to push outwardly against the mold-forming strip 40. However, because each mold-forming strip 40 is disposed in tangential contact with the side wall means 36 of the particular container section 33 or 34, the side wall means 36 thereof tend to oppose such expansion and maintain the molding strip 40 in its desired configuration. Further, since the action of the rising cake mix 38 forces the flange segments 69 against the base portion 35 of the particular container section 33 or 34, such downward force tends to hold the flange segments 69 in their original positions against the bottom wall means 35 through frictional contact therewith, whereby the flange segments 69 tend to hold the strip 40 in its original configuration against the force of the expanding cake mix 38, tending to force the molding strip 40 outwardly in the direction indicated by the arrow in FIGURE 7. If desired, such frictional contact can be increased by roughening the under-surfaces of the flange segments 69 and/or the interior surfaces of the base portions 35 of the container sections 33 and 34.

After the cake mix 38 has been baked in the two container sections 33 and 34, the same can be readily removed therefrom in any desired manner. For example, each container sections 33 and 34 can be inverted over the conventional cake-removing racks, whereby the inverted container sections 33 and 34 can be raised from the molding strips 40 and the baked products contained therein. Thereafter, the molding strips 40 can be removed by unfastening the locking means 70 thereof and stripping the same from the baked products, while the baked products are resting on the racks or other surface. Subsequently, the baked products can be assembled into the layer arrangement illustrated in FIGURE 32 and suitably iced by icing either originally packaged in the package construction or sold separately, as is conventional in the cake mix industry.

Alternately, the baked product and molding strip 40 can be lifted upwardly from the particular container section 33 or 34 by inserting the fingers under the end edge 65 of the strip 40. Thereafter, the molding strip 40 can be stripped from the baked product.

The container sections 33 and 34 and mold-forming strips 40 can be thrown away after the cake mix 38 has been baked or can be saved to be utilized again for baking or other purposes, as desired. For example, the same could now be utilized for molding ice cream, gelatin, and the like.

Therefore, it can be seen that not only does the container 31 provide means for packaging and merchandising the cake mix 38, but the same also provides the sole means for shaping and baking the cake mix 38 without requiring the ultimate consumer to utilize additional equipment which would subsequently require washing and cleaning, because the container 31 can be thrown away after it has been used.

Further, not only can the ultimate consumer utilize the rectangular compartments 37 of the sections 33 and 34 to form a square or rectangular layer cake, but the ultimate consumer has the option of utilizing the mold-forming strips 40 to produce single layer or double layer cakes having any selected configuration.

For example, the molding strips 40 could be utilized to form the perimeters of substantially heart-shaped mold chambers 75 in the manner illustrated in FIGURE 8. In order to hold the molding strip 40 in the heart-shaped configuration illustrated in FIGURE 8, a separate rigid paperboard member 76 or the like is originally packaged with the cake mix 38, or may be supplied by the housewife from any suitable material. The member 76 is wedged in the corner of the particular container section 33 or 34 to hold the mold-forming strip 40 in the particular heart-shaped configuration illustrated in FIGURES 8 and 9.

As previously stated, each mold-forming strip 40 is so constructed and arranged that when the ultimate consumer interlocks the tab 70 thereof in the particular pair of die cut lines 71 and 72 marked for a heart-shaped configuration, the resulting mold-forming strip 40 is adapted to be disposed in the particular container section 33 or 34 in the manner illustrated in FIGURES 8 and 9, whereby the same engages the particular side wall means 36 at the various points indicated in the drawings. Thus, the side wall means 36 of the particular container section 33 or 34 assists the flange segments 69 in maintaining the mold-forming strip 40 in the heart-shaped configuration illustrated.

Similarly, the mold-forming strips 40 can be disposed in the container sections 33 and 34 in the manner illustrated in FIGURE 10 to form the perimeters of mold chambers 77 having Christmas tree configurations. In order to further assist the flange segments 69 and side wall means 36 in holding the mold strips 40 in the Christmas tree shapes illustrated in FIGURE 10, a plurality of rigid paperboard members 78 or the like, similar to the members 76 previously described, can be utilized.

While the container 31 and mold-forming strips 40 are illustrated as being adapted to provide rectangular, cylindrical, heart-shaped, or Christmas tree-shaped cakes and the like, it is to be understood that the ultimate consumer can arrange the molding strips 40 in the particular container sections 33 and 34 in any desired manner whereby the resulting mold chambers could have any selected configurations, because the flange segments 69 thereof would function in the manner previously described to hold the end edges 65 in intimate contact with the base sections 35 and in their selected configurations.

However, since heart-shaped cakes are appropriate in the Valentine season, and since the Christmas tree-shaped cakes are appropriate in the Christmas season, the same are more commonly used than other special configurations, except, of course, the conventional rectangular and cylindrical shapes.

Figure 14:
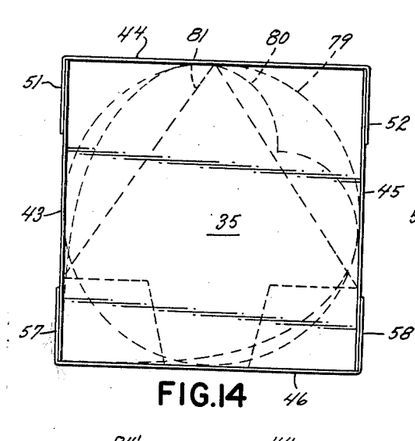
FIGURE 14 is a plan view of one of the container sections of this invention and illustrates the method of marking the same, so as to facilitate positioning of the mold-forming member therein to form various mold chambers having selected configurations.

Accordingly, the inside surfaces of the base sections 35 of the container sections 33 and 34 can be appropriately marked by the manufacturer with the more frequent cake patterns desired by the ultimate consumers in the manner illustrated in FIGURE 14, whereby the ultimate consumer can follow the particular marked pattern to properly fit the molding strips 40 in place to produce baked goods having the desired configuration. For example, the bottom walls 35 of the container sections 33 and 34 could be marked with circles 79, heart-shaped patterns 80, and Christmas tree patterns 81. Thus, the ultimate consumer can easily bend and place the molding strips 40 in the particular container sections 33 and 34 in such a manner that the same merely trace the desired marked patterns 79, 80, or 81 to produce the desired shaped layers of baked goods.

However, the ultimate consumer can bend the strips 40 into any desired configurations to provide mold chambers in the container sections 33 and 34 having perimeters other than those illustrated in the drawings, because the strips 40 are flexible and the flange segments 69 provide means for holding the strips 40 in their selected configurations during the subsequent baking operation and do not interfere with the bending operation of the strips 40, although the segments 69 are subsequently disposed transversely thereto.

Therefore, it can be seen that the container 31 and mold-forming means 40 of this invention provide means for forming one or two layers of baked goods having any selected configuration in a simple and effective manner without requiring additional baking equipment as is required when utilizing cake mix and the like packaged in conventional package constructions.

Although the mold-forming strips 40 are each illustrated as having separate locking means 71–73 for each of the configurations illustrated in the drawings, it is to be understood that the cylindrical, heart-shaped, Christmas tree, and other patterns thereof could be so designed that the molding strips 40 could form all of the basic configurations when having the tongues 70 thereof disposed in only one set of locking means 71–73 whereby the ends 67 of the strips 40 would only require one set of locking means 71–73 to be formed therein.

Further, such locking means 70–73 could be entirely eliminated and the ends 66 and 67 could be appropriately fastened together in the desired position by stapling or the like. When the ends 66 and 67 of the strips 40 are so fastened together, the same could be stripped from the baked products by merely tearing the strips 40 between the end edges 64 and 65 thereof, because the strips 40 are merely formed of paperboard material. If desired, the strips 40 could be provided with a perforated separation line for such purpose in the same manner as provided by the perforated separation lines 82 of FIGURE 15, the viscosity of the baking material 38 being such that the same will not tend to seep out through such small perforations or die cuts 71 and 72 formed in the strips 40.

It may be found desirable to provide means for maintaining the mold-forming strips 40 in the desired configurations in addition to the effect of the rising dough acting against the flange segments 69 thereof and having the mold-forming strips 40 abut the side wall means 36 of the container sections 33 and 34. Such means would be particularly desirable when the mold-forming strips 40 are being utilized to form complex configurations and/or the same do not make contact with the side wall means 36 of the container sections 33 and 34.

Figure 15:
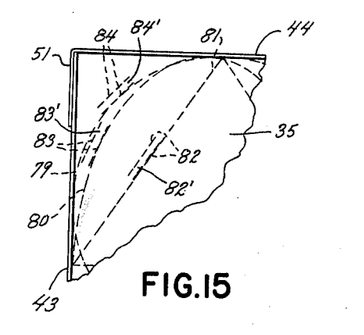
FIGURE 15 is a fragmentary view similar to FIGURE 14 and illustrates another embodiment of this invention.

One such means would be to provide a plurality of sets of perforated or die cut lines 82, 83, and 84 in the bottom walls 35 of the container sections 33 and 34, in the manner illustrated in FIGURE 15, the lines 82, 83, and 84 respectively defining tabs 82', 83', and 84' adjacent the more critical, unsupported portions of the Christmas tree, heart-shaped, and cylindrical patterns 81, 80, and 79. Thus, when the ultimate consumer is disposing the mold strips 40 therein to form a selected mold chamber, such as the Christmas tree mold chamber 77 illustrated in FIGURE 16, the consumer merely bends certain of the flange segments 69 in a direction away from the mold chamber 77 and inserts the same under the tabs 82', in the manner illustrated in FIGURES 16 and 17, whereby the tabs 82' assist in holding the particular mold strip 40 in the desired configuration during the subsequent baking operation, because the tabs 82' abut the body portion of the strip 40 and oppose any outward movement of the strip 40.

Such die cuts or perforations 82–84 could be formed during the die cutting operation of the blank 42 and would not have an adverse effect upon the cake mix 38 disposed in the package construction 30, because the mix 38 is protected by the bag 39 and/or the overwrap 41.

Since the consistency of the cake mix 38 disposed in the particular mold chambers is relatively viscous, the same will not tend to leak through the perforations or die cuts disposed within the particular mold chambers, such as when a cylindrical mold chamber is being utilized, or through the particular tabs 82', 83', or 84' being utilized.

Even if such perforated lines or die cuts 82–84 are not provided, the ultimate consumer can form the tabs 82'–84' as required by merely slitting the base portions 35 of the container sections 33 and 34 with a suitable paring knife and the like. Also, should an unusual mold chamber be utilized, the ultimate consumer can provide such tabs in the proper positions for holding the molding strip 40 in place.

Figure 18:
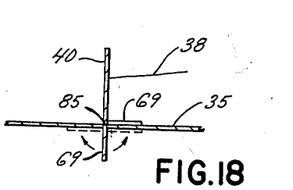

If desired, a plurality of single die cuts or perforated lines 85, FIGURE 18, could be superimposed upon the various outlines of the more conventional mold chamber configurations in substantially the same manner as the die cuts 82–84, whereby certain selected flange segments 69 of the mold-forming strip 40 can be inserted downwardly through the slits 85 in base portions 35 of the container sections 33 and 34 to assist in holding the mold-forming strips 40 in the desired configurations.

Since the conventional pan-supporting racks in ovens and the like are formed from a plurality of widely spaced parallel wire lengths, the flange segments 69 projecting through the bottom walls 35 of the container sections 33 and 34 can remain in the extended positions illustrated in full lines in FIGURE 18 by passing between such wire segments in the oven racks, so that the container sections 33 and 34 can be disposed in a horizontal position thereon. However, it is to be understood that the segments 69 passing through the base portion 35 could be bent either to the right or left, as illustrated in FIGURE 18 by dotted lines, so that the container sections 33 and 34 can be placed upon a flat surface without interference from the flange segments 69 interlocking the mold strips 40 to the container section 33 or 34 and passing through the die cuts 85.

Obviously, the ultimate consumer can also form the slits 85 in the base portions 35 of the container sections 33 and 34 in the positions desired with a simple knife cutting operation.

The flange segments 69 passing through the slits 85 assist in holding the mold-forming strips 40 in the proper positions in the container sections 33 and 34, because the fold or score lines 65 of the particular flange segments 69 are disposed slightly above the interior surfaces of the base portions 35, whereby unbent portions of the segments 69 are received in the slits 85. Further, since the segments 69 are press-fitted into the slits 85, the inserted segments 69 are held in frictional engagement with the base portions 35 so that outward movement of the strips 40 during the expansion of the baking cake mix is resisted and retarded by the segments 69 passing through the slits 85. Thus, the slits 85 provide means for operatively interconnecting the mold strips 40 to the container sections 33 and 34, so that the same will retain these selected configurations during the subsequent baking operation.

Figure 17:
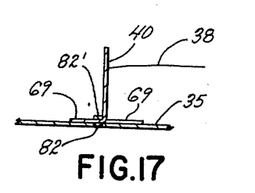
FIGURE 17 is a fragmentary, cross-sectional view of the structure illustrated in FIGURE 16 and is taken on line 17—17 thereof.

After the products have been baked in mold chambers formed in the manner set forth in the embodiments illustrated in FIGURES 17 and 18, the baked products and mold-forming strips 40 can be readily lifted in unison from the container sections 33 and 34 by merely inserting fingers under the end edges 65 of the mold-forming strips 40 and prying upwardly, whereby the flange segments 69 interlocked with the tabs 82'–84' or slits 85 can be withdrawn therefrom and, thus, disconnected from the container sections 33 and 34. Thereafter, the mold-forming strips 40 can be stripped from the baked products in the manner previously described.

Figure 19:
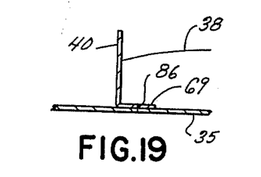

Further, the ultimate consumer can utilize the mold-forming strips 40 to form unusually shaped mold chambers within the container sections 33 and 34, in the manner illustrated in FIGURE 19, whereby the mold-forming strips 40 are held in the desired configuration by stapling certain flange segments 69 to the base portions 35 of the container sections 33 and 34 by staples 86 or other suitable fastening members. Such staples 86 also assist the flange segments 69 in holding the mold strips 40 in its proper position when the baking cake mix is rising.

Figure 20:
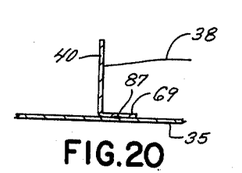

Also, certain flange segments 69 may be held in the desired position against the bottom portions 35 of the container sections 33 and 34 by a suitable adhesive 87 disposed therebetween, as illustrated in FIGURE 20. However, such adhesive 87 should not have an adverse effect on the product being baked and should not be affected by heat. One such suitable adhesive 87 is merely a combination of flour and water that will not contaminate the baked products nor become unglued during the baking operation. If desired, the package construction 30 could contain a small bag of flour paste for such purpose.

While the molding strips 40 can be utilized to form the entire perimeters of the mold chambers having any selected configuration, in the above manner, the molding strips 40 could also cooperate with selected portions of the side wall means 36 of the container sections 33 and 34 to provide the perimeters of the mold chambers. For example, a length of a mold-forming strip 40 could be cut and positioned in the particular container section 33 illustrated in FIGURE 21, whereby the container section 33 is divided into two identical, rectangular mold chambers 88 and 89. Thus, should the ultimate consumer desire to only bake a small layer cake, each section 88 and 89 can be utilized for forming two half-layers, while the other container section 34 and remaining cake mix 38 can be used at a later time to form a similar layer cake or a single-layer cake having any desired configuration.

Figures 21, 22, 23:
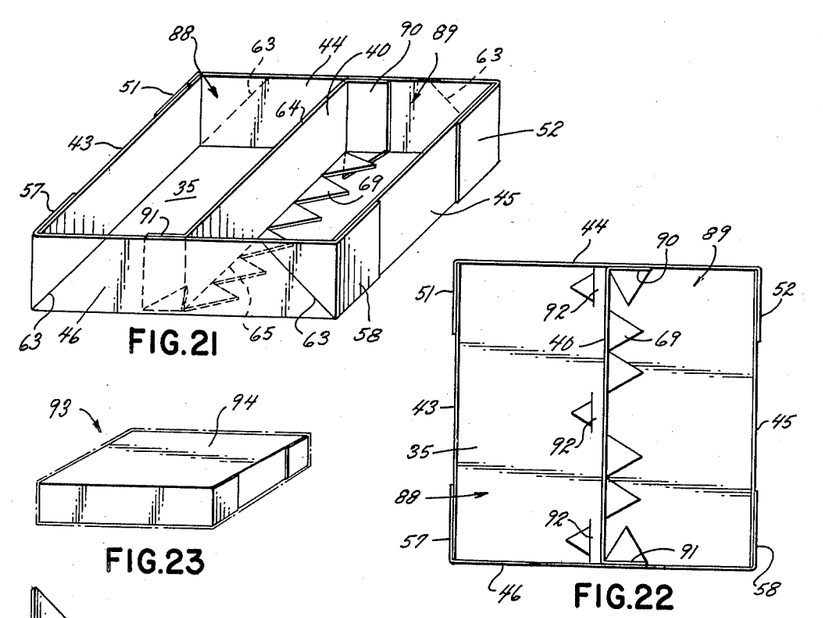
FIGURE 21 is a perspective view of one of the container sections of this invention and illustrates one method of dividing the same into a plurality of identical mold chambers.
FIGURE 22 is a plan view of the container structure illustrated in FIGURE 21 and illustrates another embodiment of this invention.
FIGURE 23 is a perspective view illustrating another package construction of this invention.

As illustrated in FIGURE 21, the molding strip 40 could be so cut that end portions 90 and 91 thereof may be respectively folded against the side walls 44 and 46 to assure complete separation of the compartments or mold chambers 88 and 89, and the ends 90 and 91 may even be secured in any suitable manner to the side walls 44 and 46. The flange segments 69 of the strip 40 can extend into one compartment, if desired or can alternate between the two compartments 88 and 89.

However, should it be desired to only bake a product in one compartment 88 or 89, such as the compartment 89 illustrated in FIGURE 22, the flange segments 69 of the strip 40 are disposed into the compartment 89, with perhaps a selected few thereof projecting beneath tabs 92, in the manner illustrated in FIGURES 16 and 17, to hold the molding strip 40 in a substantially straight position across the container section 33 during the subsequent baking operation. Further, the ends 90 and 91 of the strip 40 may be disposed into the compartment 89, whereby the expanding cake mix disposed therein will tend to press the ends 90 and 91 against the side walls 44 and 46 to prevent the same from leaking out of the chamber 89 into the chamber 88 during the baking operation.

While the embodiment of this invention illustrated in FIGURES 21 and 22 discloses a straight strip 40 passing between the side walls 44 and 46 thereof to provide identical mold chambers 88 and 89, it is to be understood that the strip 40 could be disposed across the container section 33 to provide different rectangular mold chambers or be disposed diagonally across the container section 33 to provide two triangular mold chambers, as desired.

Figure 24:
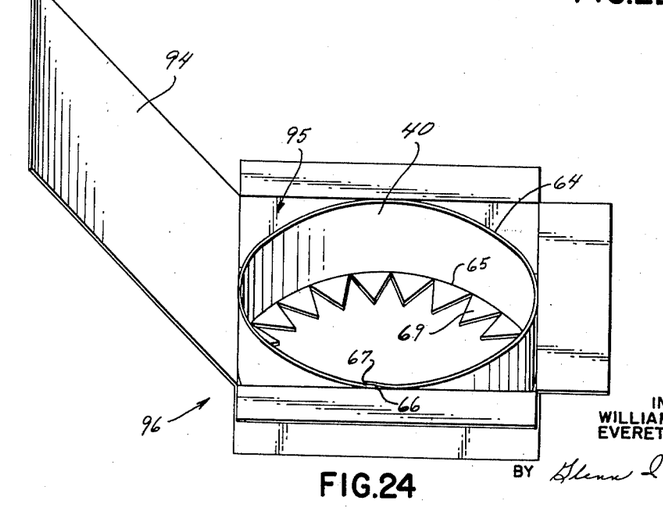
FIGURE 24 is an enlarged, perspective view illustrating the container structure of FIGURE 23 being utilized in cooperation with the mold-forming member of this invention to form a mold structure having a selected configuration.

While the container structures of this invention heretofore described are adapted to provide a plurality of separate molding and baking devices, it is to be understood that the container could be so constructed that the same only provides one baking device. For example, as illustrated in FIGURE 23, another package construction 93 of this invention is provided and is adapted to be opened in the manner illustrated in FIGURE 24 by a top lid portion 94 thereof, whereby the mold-forming means 40 packaged therein can be utilized to form any selected mold chamber or chambers in the compartment 95 of the container 96 in the manner previously described.

Also, the ultimate consumer can utilize the mold-forming strips 40 to form selected mold chambers in structures other than the containers of the goods packaged therewith, because the flange segments 69 would perform their function in the same manner previously described. Thus, the consumer can use the strips 40 in conventional baking utensils and the like, if desired.

Therefore, it can be seen that there have been provided improved methods of packaging, merchandising, and making mold structures whereby desired materials can be molded into any selected shape by merely reconstructing the container utilized to package the materials or by using the mold-forming means of this invention in combination with other structures.

Thus, it is obvious that the various structures and methods of this invention are adapted for uses other than that of producing baked products. For example, the same structures and/or methods of this invention can be utilized for forming frozen products, such as ice cream, frozen custard, and the like.

Accordingly, when the terms "baking material" and "cake mix" are utilized throughout the specification and appended claims, it is to be understood that the same are intended to also cover other types of moldable materials, whether edible or not.

While the form of the invention now preferred has been disclosed as required by the statutes, other forms may be used, all coming within the scope of the claims which follow.

What is claimed is:

1. A mold for shaping baking material and the like comprising a base member having side wall means extending therefrom, a mold-forming member having a pair of opposed ends, said mold-forming member engaging said side wall means and having one of said ends disposed against said base member, said mold-forming member defining at least part of a perimeter of a mold chamber and having means connected thereto and extending into said mold chamber to be interposed between said base member and the material to be received in said mold chamber to tend to hold said one end of said mold-forming member in contact with said base member and means disposed in contact with said side wall means and said mold-forming member to hold said mold-forming member in a desired configuration thereof.

2. A mold for shaping baking material and the like comprising a base member having side wall means extending outwardly therefrom, a flexible mold-forming strip having a pair of opposed end edges and being bent into a selected configuration, said mold-forming strip engaging said side wall means and having one of said end edges thereof disposed against said base member, said mold-forming strip defining at least part of a perimeter of a mold chamber and having means connected thereto and extending into said mold chamber to be interposed between said base member and the material to be received in said mold chamber to tend to hold said one end edge of said strip in contact with said base member, and means disposed in contact with said side wall means and said strip to hold said strip in a desired configuration thereof.

3. In combination, a bottom member having an upper surface, and an elongated mold-forming member having opposed end edges, said mold-forming member having one of said end edges theerof disposed against said upper surface of said bottom member and defining at least part of a perimeter of a mold chamber, said mold member having flange means connected to said one end edge thereof, some of said flange means extending into said mold chamber to be pressed against said upper surface of said bottom member by mold material to be received in said mold chamber to tend to hold said one end edge of said mold member in contact with said upper surface of said bottom member, other of said flange means being secured to said bottom member to hold said mold member in the desired configuration thereof.

4. In combination, a receptacle having bottom wall means and side wall means connected thereto and extending upwardly therefrom to define an open end of said receptacle, an elongated mold-forming strip having opposed end edges and being disposed in said open end of said receptacle, said strip having one of said end edges thereof disposed against said bottom wall means and defining at least part of a perimeter of a mold chamber, said strip having flange means connected to said one end edge thereof and extending into said mold chamber to be pressed against said bottom wall means by mold material to be received in said mold chamber to tend to hold said one end edge of said strip in contact with said bottom wall means, and substantially rigid means disposed between said side wall means and said strip to hold said strip in the desired configuration thereof.

5. In combination, a base member having a bottom wall and having continuous side wall means extending upwardly from said bottom wall to define a compartment therewith, and a flexible mold-forming member having a pair of opposed end edges and being bent into a selected configuration, said mold-forming member comprising a strip being disposed in said compartment to define at least part of a perimeter of a mold chamber having a selected configuration, said strip engaging said side wall means and having one of said ends disposed in contact with said bottom wall.

6. A method of making a mold for shaping baking material and the like from a base member and a mold-forming member having a pair of opposed ends and flange means connected to one of said ends thereof comprising the steps of placing said one end of said mold-forming member against said base member with certain of said flange means disposed transversely to said mold-forming member and disposed against said base member, said mold-forming member defining at least part of a perimeter of a mold chamber and said certain flange means extending into said mold chamber, interconnecting other of said flange means to said base member to hold said mold-forming member in a desired configuration thereof and placing said material in said mold chamber to be shaped thereby and to press said certain flange means against said base member to tend to hold said one end of said mold-forming member against said base member.

7. A method of making a mold for shaping baking material and the like from a base member and a flexible mold-forming strip having a pair of opposed end edges and flange means foldably connected to one of said end edges thereof, comprising the steps of bending said flexible mold-forming strip into a selected configuration, placing said one edge of said strip against said base member with certain of said flange means disposed transversely to said strip and disposed against said base member, whereby said strip defines at least part of a perimeter of a mold chamber and said certain flange means extends into said mold chamber interconnecting other of said flange means to said base member to hold said strip in a desired configuration thereof, and placing said material in said mold chamber to be shaped thereby and to press said certain flange means against said base member to tend to hold said one end edge of said mold-forming strip against said base member.

8. A method of making a mold for adapting baking material and the like from a container having baking material and a flexible mold-forming member disposed therein, comprising the steps of opening said container and removing said material and mold-forming member therefrom, placing at least part of said mold-forming member in at least part of said container to cooperate therewith to define a mold chamber having a selected configuration with flange means of said mold-forming member projecting into said mold chamber, and placing said baking material in said mold chamber to be shaped thereby whereby said baking material will press said flange means against said container to hold said mold-forming member thereto.

9. A method of making a mold for shaping baking material and the like from a container having baking material and a flexible mold-forming strip disposed therein, said strip having flange means foldably connected to one end edge thereof, comprising the steps of removing said baking material and said mold-forming strip from said container, bending said flexible mold-forming strip into a selected configuration, placing said one end edge of said strip against a base portion of at least part of said container with said flange means disposed trans- versely to said strip and disposed against said base portion, whereby said strip defines at least part of a perimeter of a mold chamber and said flange means extends into said mold chamber, and placing said material in said mold chamber to be shaped thereby and to press said flange means against said base member to tend to hold said one end edge of said strip against said base portion.

10. A method of making a plurality of selectively shaped baked goods and the like from a container having a plurality of portions and having baking material and flexible mold-forming means disposed therein, comprising the steps of removing said material and mold-forming means from said container, respectively placing parts of said mold-forming means in said portions of said containers to cooperate therewith to respectively define mold chambers having selected configurations with flange means of said mold-forming means projecting into said mold chambers, placing said baking material in said mold chambers to be shaped thereby whereby said baking material will press said flange means against said container portions to hold said mold-forming means thereto, and thereafter, baking said baking material in said container portions to produce said baked goods.

11. A method of making a selectively shaped baked product and the like, comprising the steps of providing a container, at least part of the container being adapted to form a baking means, disposing baking material and mold-forming means in said container, removing said baking material and mold-forming means from said container, forming a mold chamber having a selected configuration in said baking means of said container with said mold-forming means whereby flange means of said mold-forming means projects into said mold chamber, diposing said baking material in said mold chamber whereby said baking material will press said flange means against said baking means to hold said mold-forming means thereto, and, thereafter, baking said baking material in said baking means to produce said baked product.

References Cited in the file of this patent

UNITED STATES PATENTS

| | | |
|---|---|---|
| 993,914 | Truman | May 30, 1911 |
| 1,478,801 | Slye | Dec. 25, 1923 |
| 1,677,245 | McDonald | July 17, 1928 |
| 2,039,374 | Young | May 5, 1936 |
| 2,117,266 | Adams | May 17, 1938 |
| 2,214,475 | Napolillo | Sept. 10, 1940 |
| 2,411,857 | Harriss | Dec. 3, 1946 |
| 2,556,568 | Aikman | June 12, 1951 |
| 2,860,583 | Hitch | Nov. 18, 1958 |

FOREIGN PATENTS

| | | |
|---|---|---|
| 116,998 | Great Britain | July 4, 1918 |